April 6, 1926.
R. B. OWEN
1,579,733
INSULATOR FOR BATTERY PLATES
Filed Nov. 21, 1919
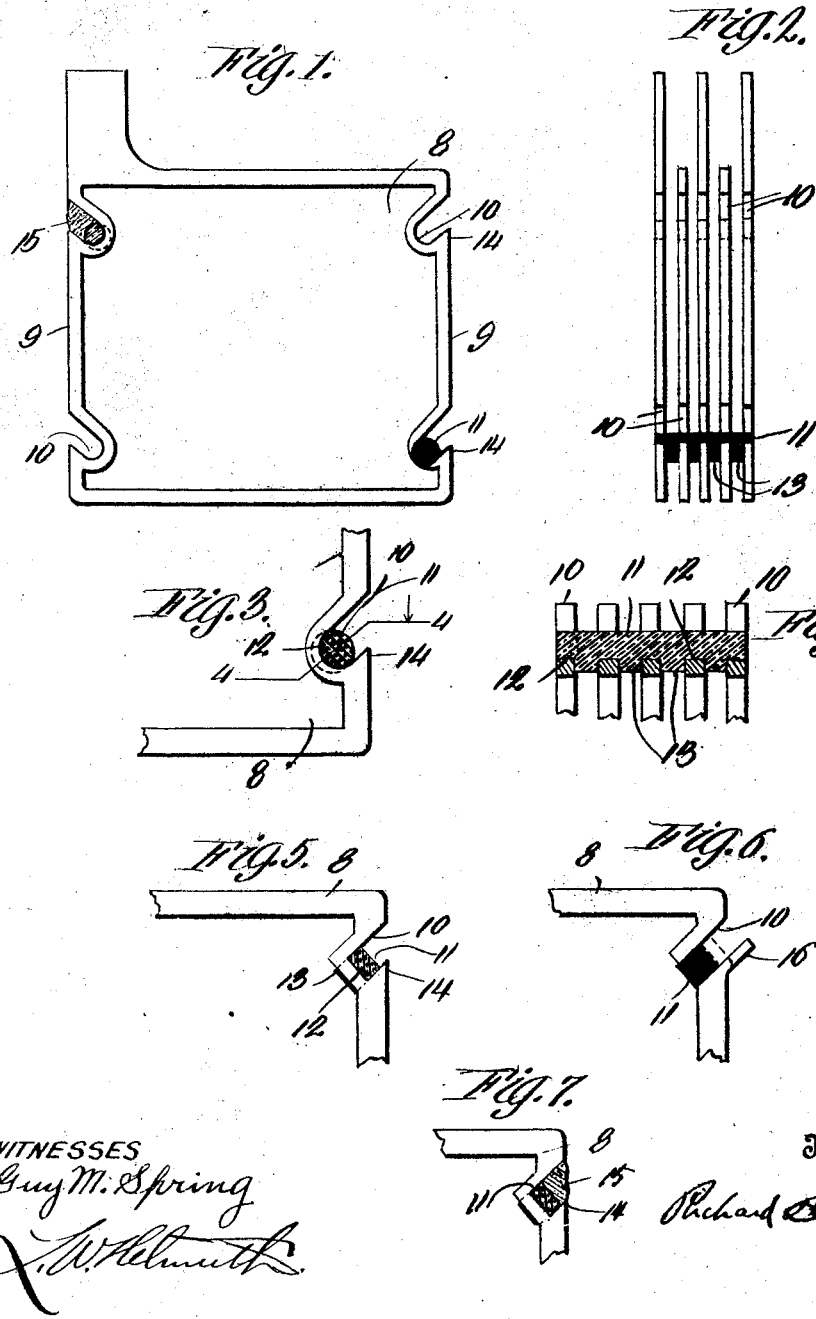
WITNESSES
Guy M. Spring
Inventor
Richard B. Owen Patented Apr. 6, 1926.

1,579,733

UNITED STATES PATENT OFFICE.

RICHARD B. OWEN, OF WASHINGTON, DISTRICT OF COLUMBIA.

INSULATOR FOR BATTERY PLATES.

Application filed November 21, 1919. Serial No. 339,645.

*To all whom it may concern:*

Be it known that I, RICHARD B. OWEN, a citizen of the United States, residing at Washington, District of Columbia, have invented certain new and useful Improvements in Insulators for Battery Plates, of which the following is a specification.

This invention relates to new and useful insulators, for accumulator electrodes or plates of secondary batteries, the primary object of the invention being to provide insulators which will rigidly maintain the electrodes or battery plates in spaced relation to one another and separated electrically, but which may be quickly and easily assembled with the plates.

Another important object of the invention is to provide a device of the above nature which will permit of the battery plates containing the maximum amount of active material, and will prevent buckling or warping of the plates to a certain extent.

Another important object of the invention is to provide insulators which are so constructed as to prevent any disintegrated particles of active material from lodging thereon to cause a short circuit.

A still further object of the invention is to provide insulators which will effectively maintain the battery plates in spaced relation to one another, and means whereby the insulators are securely maintained in engagement with the battery plates, thereby permitting the plates to be removed from or replaced in the cell jar in a body without any danger of the plates and the insulators becoming separated.

My invention also consists in the construction, arrangement and combination of the various parts of the device whereby the objects contemplated are obtained, as hereinafter more fully set forth, pointed out in the appended claims, and illustrated in the accompanying drawings.

In the drawings, wherein are shown preferred embodiments of the invention, and wherein like numerals are employed to designate like parts throughout the several views:—

Figure 1 is a side elevation of battery plates with a pair of my improved insulators associated therewith, Figure 2 is an end elevation of the same, Figure 3 is an enlarged fragmentary view of a portion of a battery plate with the invention applied, Figure 4 is a section taken on the line 4—4 of Fig. 3, Figure 5 is a fragmentary view of a portion of a battery plate with a modified form of my invention applied thereto, the insulator being sectioned, Figure 6 is an end elevation of this modified form of insulator applied to a modified form of battery plate, and Figure 7 is a section through the modified form of insulator shown in Fig. 5, illustrating one manner of maintaining the insulator in engagement with the battery plates.

In the drawings, wherein for the purpose of illustration is shown preferred embodiments of the invention, the numeral 8 designates a battery plate of any desired construction, the opposite edges 9 of which are each provided with a pair of inwardly extending downwardly inclined recesses 10, the bottom of each being rounded as clearly shown in Figs. 1 and 3 to more snugly receive insulators of a type to be hereinafter described.

As clearly shown in Fig. 1, the recesses 10 are preferably provided adjacent the corners of the plates whereby the latter, when the insulators are associated therewith, will be reinforced at necessary points thus preventing buckling or warping of the plates adjacent the corners thereof. The insulators or spacing elements 11 are in the present instance, round in cross section, and in view of this construction, no particles of disintegrated active material can very well lodge upon the portions of the insulator between the various plates. However, should such particles by any chance lodge thereon, they will be removed therefrom by the motion or splashing of the electrolyte. One side of each insulator is equipped with a plurality of spaced notches 12 which extend into the insulator a depth of approximately one-half the thickness thereof. The notches 12, of course, provide a plurality of spaced arms or lugs 13, the opposite faces of which engage adjacent faces of opposing battery plates. As more clearly shown in Fig. 4, the arms or lugs 13 are so arranged that notches 12 are provided at opposite ends of each insulator, whereby the end negative plates N may be locked apart from the adjoining positive plates without the necessity of extending the insulators beyond a point where they are flush with outer sides of the end negatives and contact the walls of the cell jar.

As shown, the insulators 11 are of such size that they are wholly received within the recesses 10 to such an extent that the shoulder 14 on the lower edge of each recess 10 is arranged outwardly of its respective insulator. After the insulators have been associated with the battery plates whereby the bottoms of the recesses 10 engage the notches in the insulators, and the plates are spaced apart by the arms 13, the open ends of the recesses 10 may be closed by molding or forming any kind of suitable material, such as lead, within the open ends to completely fill the same and enclose the portions of the insulators falling within the recesses. Thus, the insulators are securely fastened through the entire group of battery plates, and any movement is prevented either by the closing material 15 or the lugs 13. Manifestly, the plates may be unitarily or bodily removed from the cell jar or vessel for repairing, replacement or otherwise, and be inserted in the same manner without any danger of the groups becoming disassembled.

In the modified form of invention as shown in Figs. 5 and 7, the bottoms of the recesses 10 are straight instead of round and inclined downwardly and outwardly of the battery plates, the insulators 11 being approximately square in cross section. The notches 12 are provided in one side of the insulator, the bottoms of the notches being flat to closely fit and engage the straight bottoms of the recesses 10. Arms 13 are as usual provided by the plurality of notches 12, and due to the particular construction of the bottoms of the recesses 10 and the notches 12 in the insulators, the upper faces or sides of the insulators incline downwardly to cast off any particles of disintegrated active material which may fall upon these faces. A sealing material 15 may be also provided for closing the open ends of the recesses and for engaging the insulators to hold the same securely in engagement with the recesses.

In still another form of the invention, as shown in Fig. 6, the construction of the recesses 10 and insulators 11 is identical with the preceding form. However, a different form of means for closing the open ends of the recesses 10 has been provided and may be effectively used in connection with some battery plates. This closure is established by providing the lower edge of each recess with an outwardly and upwardly extending projection or tongue 16, which extends beyond its respective edge of the battery plate. It is to be noted that the relative upper face of this projection 16 is continuous with the bottom edge of its respective recess 10, so that after the insulator has been properly seated within its respective recess, the tongue 16 is bent inwardly until its upper face engages with the face of the insulator opposite to that face thereof having notches therein. It will also be noted that this projection is of such dimensions that it completely closes the open end of its respective recess, and the insulator is securely maintained therein.

Of course, it is obvious that all of the recesses 10 need not be closed with a closure 15 or 16 to prevent displacement of the insulators, but they may be maintained in their proper position by merely sealing or closing the open ends of the recesses in the end negative plates or in any other plate or plates of the group which may prove effective.

It is to be understood that I do not desire to limit myself to the exact forms of invention herein set forth, but it is to be understood that I may make such changes, in the size, shape and arrangment of parts, as will fall within the spirit of the invention and the scope of the subjoined claims.

Having thus fully described my invention what I claim as new and desire to secure by Letters Patent, is:—

1. The combination with battery plates having downwardly inclined notches in its edges extending into the plates proper, of means extending through said notches and supported thereby to maintain the plates spaced apart.

2. The combination with battery plates having supporting means on the vertical edges thereof, and pliable projections, of a notched spacing element supported by the supporting means on the vertical edges of the plates, and the pliable projections adapted to be bent to retain the spacing element on the supporting means.

3. In combination with storage battery plates having notches in their lateral margins, and insulators provided with notches complementing the notches in said plates to interlock the plates and insulators.

4. The combination of battery plates having edges provided with recesses extending into the plates proper, of insulators extended through said recesses, and having notches to admit the adjacent portions of the battery plate, and means for closing the open ends of said recesses.

5. The combination with battery plates having edges provided with supporting shoulders; of an insulator supported on said shoulders and having means to space the plates apart, and a material received on said shoulders in a soft state and adapted to harden thereon for preventing displacement of the insulators therefrom.

6. The combination with battery plates having edges provided with recesses, of an insulator received in said recesses and having means to securely retain the plates in spaced relation, and portions of said plates being bent to engage said insulators to maintain the same in position.

7. The combination with battery plates having edges provided with recesses, of insulators received in said recesses and having means for retaining the plate spaced apart, said plates being provided with extensions adapted to be bent to engage said insulators to maintain the same in position.

8. The combination with battery plates having edges provided with recesses, the plates adjacent the recesses being provided with outwardly extending projections, of insulators received in said recesses and having means for spacing the plates apart, and said projections being bent to close the open ends of the recesses and engage the insulators for preventing displacement thereof.

9. The combination with battery plates having downwardly inclined recesses having inclined bottoms, of insulators substantially square in cross-section received in said recesses.

10. The combination with battery plates having downwardly inclined recesses, the bottoms of said recesses being inclined, of insulators substantially square in cross-section received in said recesses, said insulators having a plurality of notches therein, the bottoms of said notches resting on the inclined bottoms of said recesses, the upper faces of said insulators being inclined downwardly to cast off disintegrated particles of active material.

In testimony whereof, I affix my signature.

RICHARD B. OWEN.